Feb. 26, 1957 B. C. THOMSON 2,782,581
FOLIAGE STRIPPING FINGER FOR CANE HARVESTERS
Filed July 13, 1953 6 Sheets-Sheet 2
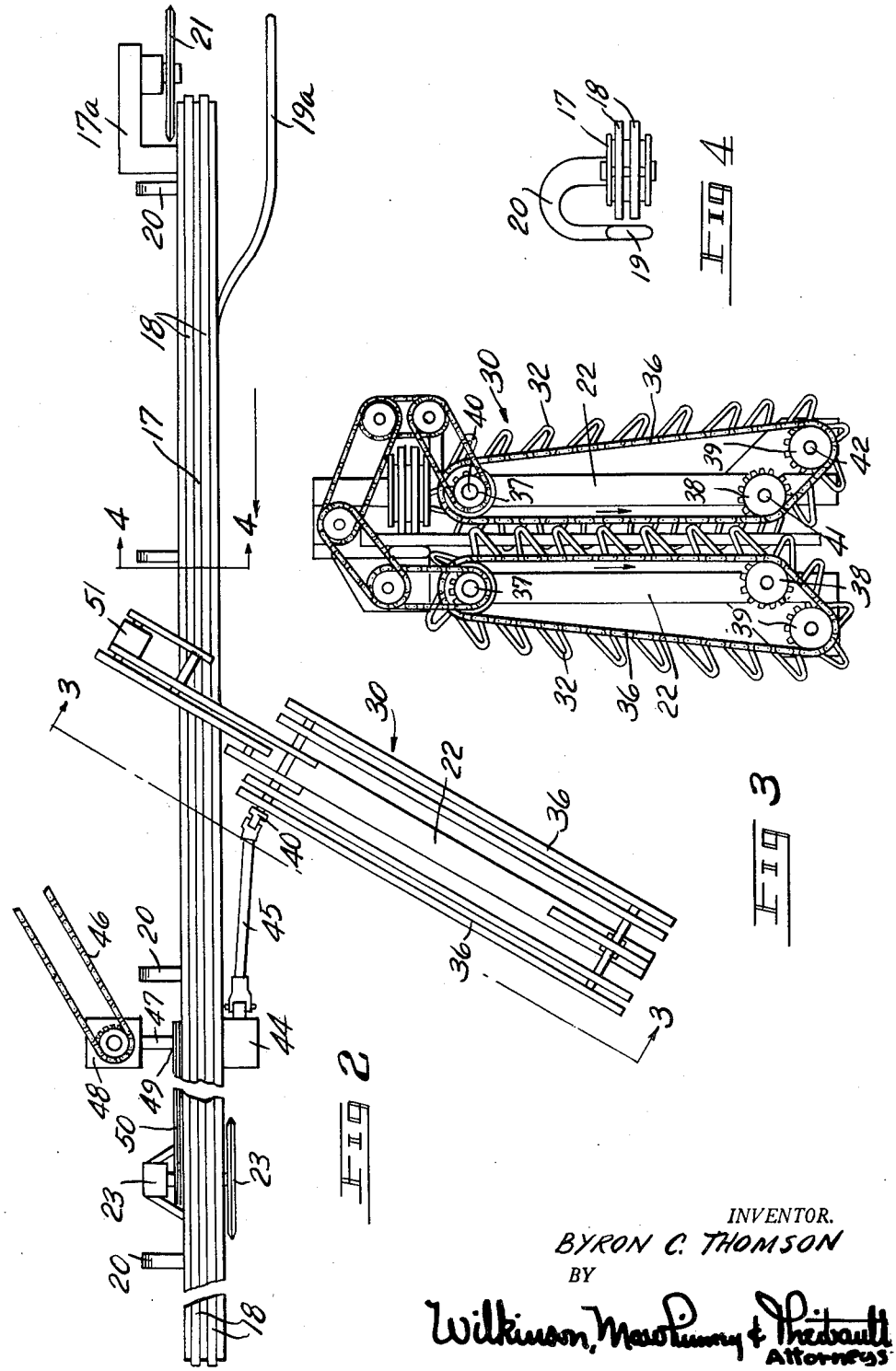
INVENTOR.
BYRON C. THOMSON
BY
Wilkinson, MacPhinny & Thedault
Attorneys

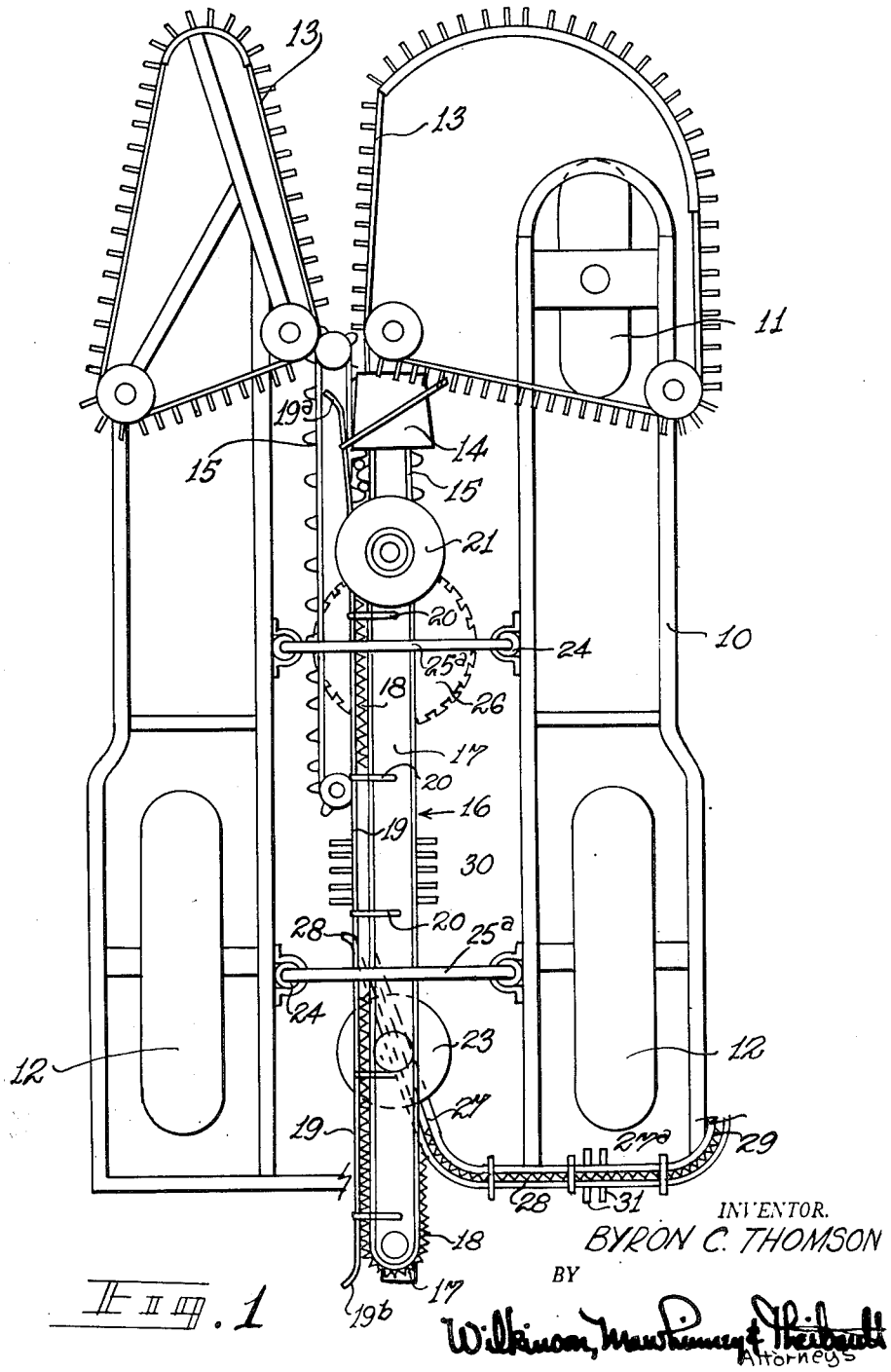

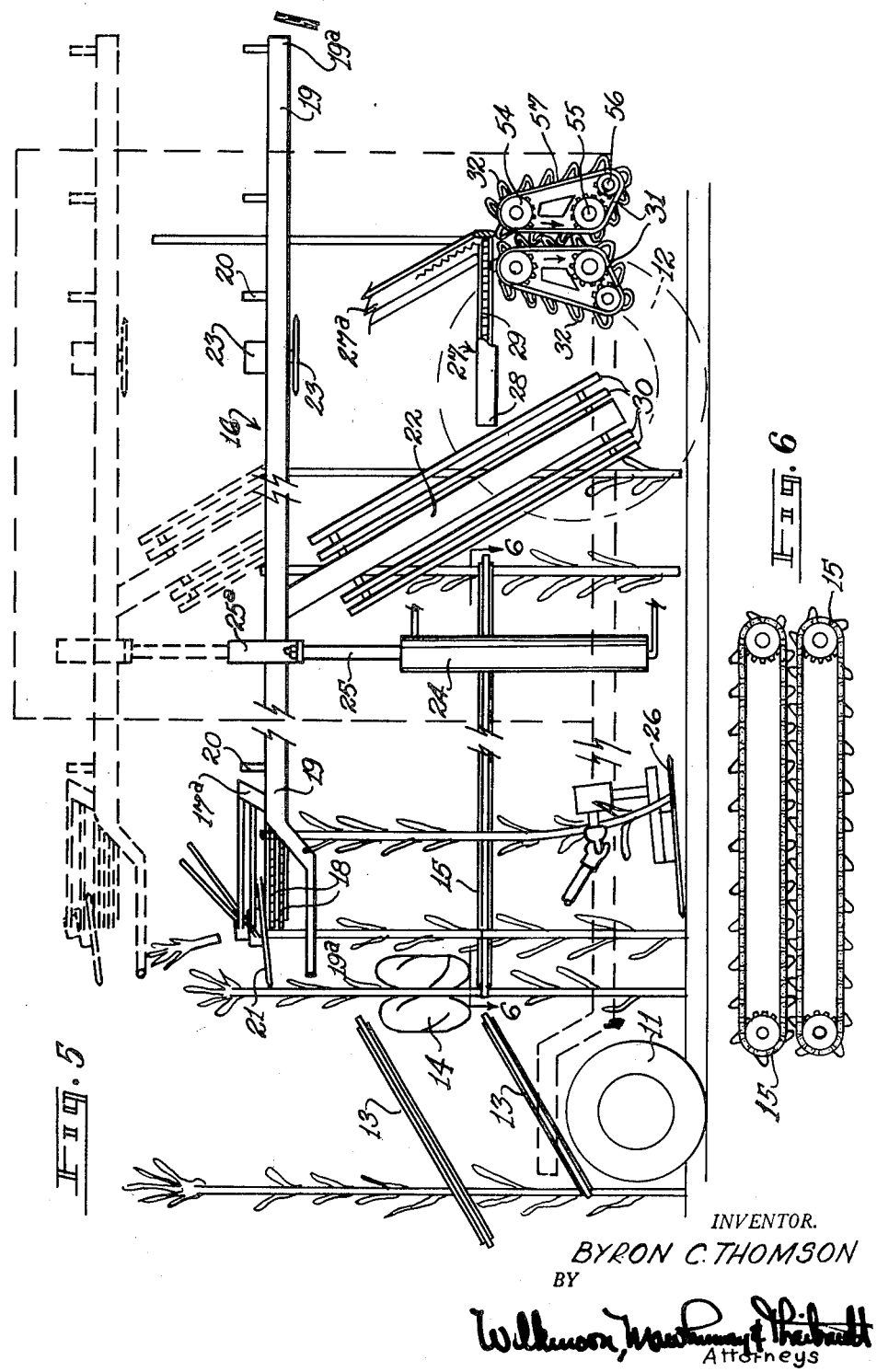

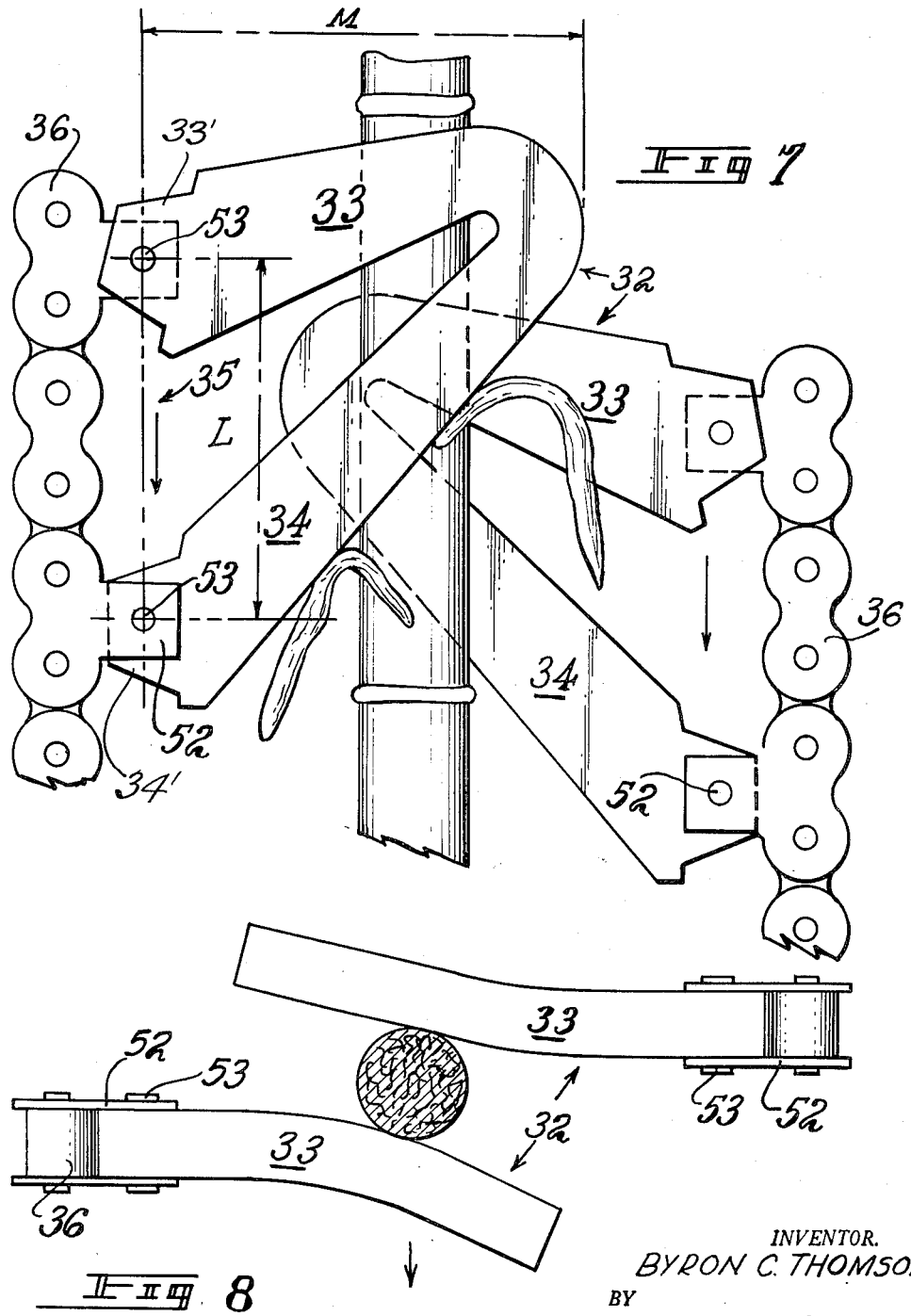

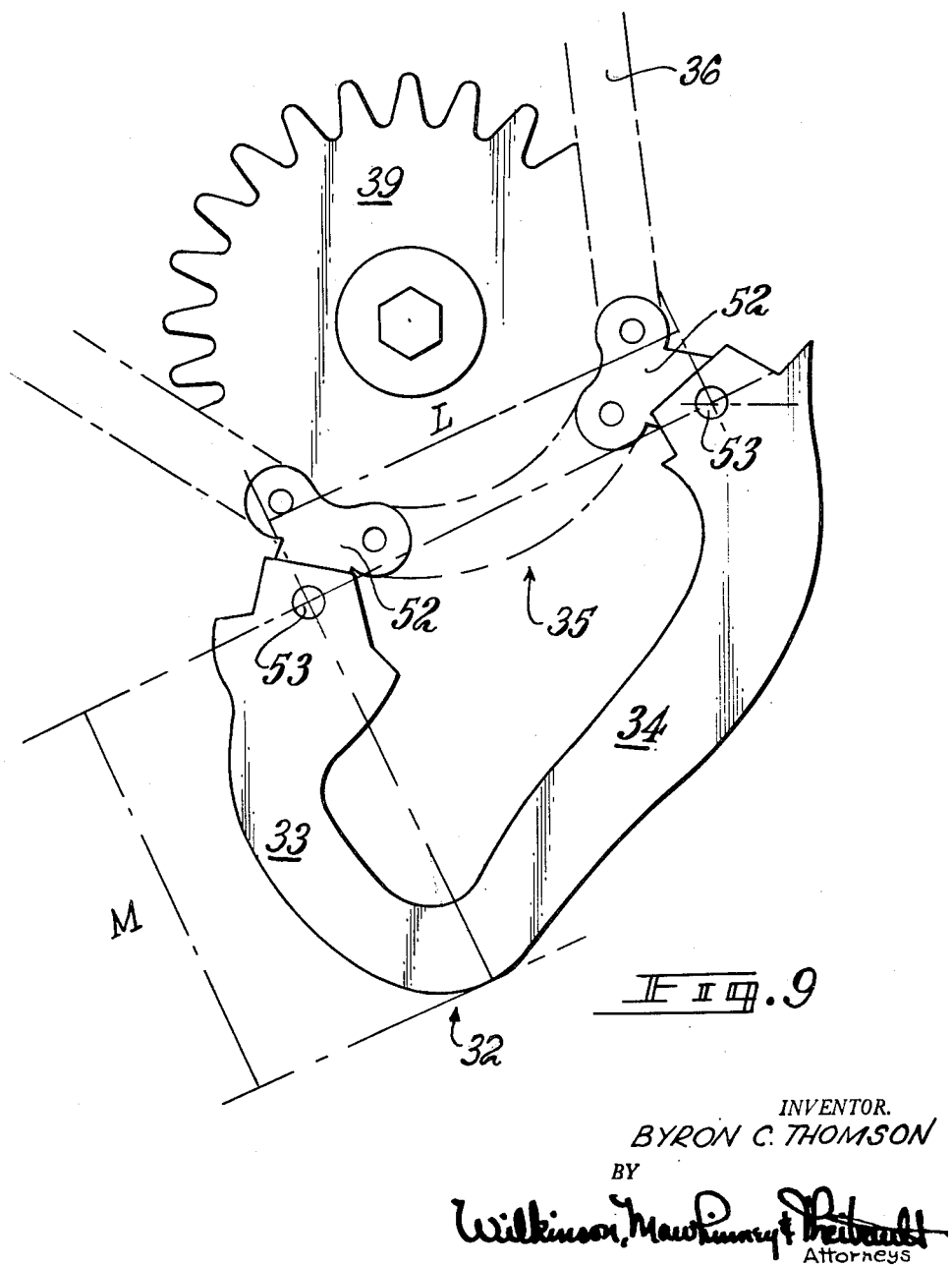

Feb. 26, 1957 B. C. THOMSON 2,782,581
FOLIAGE STRIPPING FINGER FOR CANE HARVESTERS
Filed July 13, 1953 6 Sheets-Sheet 6

INVENTOR.
BYRON C. THOMSON
BY
Wilkinson, Mawhinney Theiss
Attorneys

United States Patent Office 2,782,581
Patented Feb. 26, 1957

2,782,581

FOLIAGE STRIPPING FINGER FOR CANE HARVESTERS

Byron C. Thomson, Thibodaux, La.

Application July 13, 1953, Serial No. 367,382

13 Claims. (Cl. 56—17)

The present invention relates to foliage stripping finger for cane harvesters and has for an object the elimination of mechanical shortcomings in the art of sugar cane harvesting, particularly in the phases of topping, cutting and stripping.

Prior to the present invention, no mechanical devices have been produced commercially which would perform the requisite operations with a rapidity and completeness sufficient to warrant commercial investment in a mechanical device over unskilled labor. The prior art industrially advanced several machines, some of which topped and cut and some of which stripped. These previous commercial machines did not lend themselves to a practical solution of the problem at hand nor were they versatile or flexible enough to compensate for the variable conditions existent in the cane fields and among different types of cane having different physical characteristics.

The foliage extending off a cane stalk has a natural tendency to rise upwardly along the stalk and any stripping action having an upward component will cause the leaves to wrap about and protect the cane stalk. Nature also provided this upward bias of the leaves as rain traps. For a stripping action to be successful, that is resulting in a complete defoliation of the cane stalk, the stripping motion must be directed downwardly. I have found in practice that to obtain satisfactory over-the-ground speed of the harvester, the stripping action will not delay the harvester if the stripping action is given not only a downward but also a rearward vector so that the cane stalk while being stripped will actually be aided in its passage through the harvester.

In obtaining clean cane, it is essential that the cane be topped at the proper height known as the line of maturity as to top the cane too low results in a loss of valuable sucrose content of the stalk and to top too high results in an unclean stalk having immature sugars therein detrimental to refining practices; therefore, it is important that the topping device possess instantaneous flexibility to instantaneously compensate for varying heights of cane throughout a pass down a standing row.

There are areas in the same field where, due to variations in agricultural fertility, some cane will grow to a greater height than others and it is important that the harvester be provided with a device to compensate for the varying heights of cane.

A further important feature of the present invention is the provision of a longitudinal conveyor for gripping the cane stalk which has been topped and severed from the ground and which will grasp this cane at its uppermost end portion leaving the remainder thereof free to be stripped downwardly by a battery of stripping devices. Such a device which grasps the cane at its top and which will tenaciously hold on to the cane against the downwardly directed wiping or scraping of stripper members, must likewise be instantaneously adjustable vertically to compensate for differential cane heights. The portion of the cane stalk tenaciously grasped by the longitudinal conveyor which conveys the cane stalk past the stripper members, is often distorted and shredded and must be removed from the cane stalk prior to its loading into a cane cart for transportation to the refinery. Accordingly, I have found it advantageous to provide a secondary or final topping cutter which severs the cane stalk from the top gripped portion held by the longitudinal conveyor and which permits a discharging of this gripping stalk rearwardly of the harvester as it progresses over a standing row of cane.

I have proposed in practice and have obtained satisfactory results from combining the top cutter, the horizontal conveyor and gripper with a final topper cutter all of which may be mounted centrally in the harvester frame along the longitudinal axis thereof and which may be elevatable up and down for the complete treatment of cane stalks, the stripper members being carried by the longitudinal conveyor frame member between the primary and secondary toppers and which will be raised or lowered simultaneously therewith.

The particular advantage derived from this novel construction is that the cane trash stripped from a cane stalk is discharged downwardly or earthwardly and such trash does not enter any of the moving parts of the cane harvester, there being nothing beneath the strippers. I have also found that a secondary set of stripper members may be incorporated in the final conveyor member carried by the harvester, which conveyor is situated at the rear of the machine and which carries the cane through a turn greater than ninety degrees and elevates the cane to a discharge basket for loading same into cane carts. These secondary strippers are situated upon the harvester frame beneath the vertically elevated portion of the loader conveyor and in such a manner that as the cane stalks are grasped by the conveyor and elevated the lower portions thereof are stripped completely thereby leaving an absolutely clean cane stalk free from any foliage, ready for shipment to the refinery.

The cleaning motion of the strippers is correlated with the forward motion of the harvester over the standing cane rows so that each cane stalk receives a complete stripping or cleaning regardless of the over-the-ground speed of the harvester. Upon fast operation of the harvester cane stalks are not merely jammed or pushed through the harvester, but are subjected to a complete defoliating action.

A still further object of the present invention is to provide a cleaning device comprising a plurality of novel stripping fingers which eliminate the clogging, jamming or matting of the defoliated trash about the stripper finger resulting in a jamming or completely ineffective stripping motion. Such novel stripping finger has a desirable degree of resiliency, sufficient to retain its operative geometrical form and not too rigid to injure the outer fiber covering of the cane stalk proper. This novel form of stripping finger permits of a deflection upon being passed around a sprocket whereby the altitude of the triangular form of the finger is decreased and such decrease co-operates with the centrifugal whipping action of the finger about the sprocket to discharge the trash therefrom earthwardly.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view with parts broken away of a harvester having installed thereon the improved cane cutting and defoliating device of the present invention;

Figure 2 is a side elevational view with parts broken away of the improved cutting and defoliating devices for attachment on a cane harvester;

Figure 3 is a rear elevational view of the same taken on the lines 3—3 in Figure 2;

Figure 4 is a vertical section taken on the line 4—4 in Figure 2;

Figure 5 is a diagrammatic longitudinal view through a harvester having the improved cutting and defoliating devices thereon showing the cutters and strippers in both a raised and lowered position;

Figure 6 is a top plan view of the carrier conveyor taken on the line 6—6 in Figure 5;

Figure 7 is a fragmentary front elevational view of an opposed pair of stripper members having a stalk of cane therebetween with parts broken away;

Figure 8 is a top plan view of Figure 7;

Figure 9 is a side elevational view of the form of stripper finger shown in Figure 7 with the chain and stripper finger rounding a sprocket.

Figure 10:
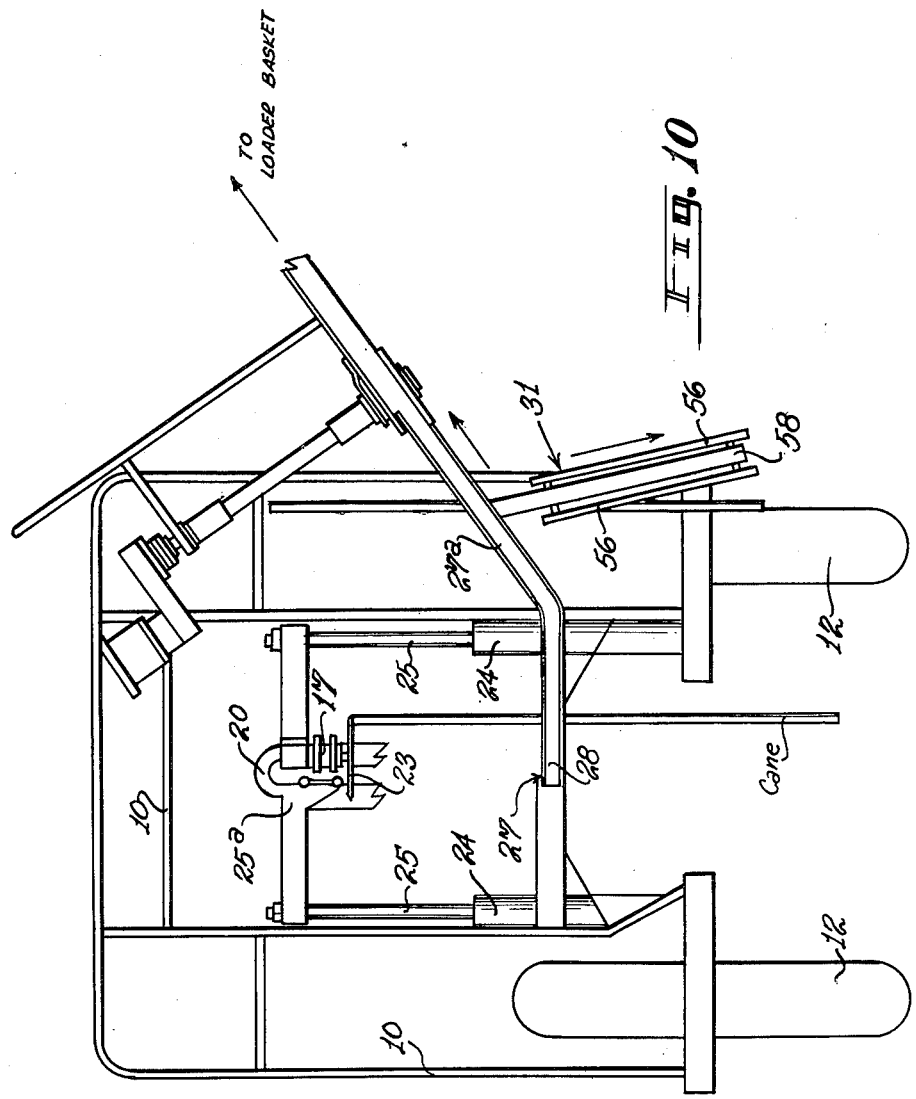
Figure 10 is a rear elevational view of a harvester having the present invention installed thereon.

Referring more particularly to the drawings, the present invention is mounted upon, for example, a cane harvester. The cane is gathered into the harvester by the gathering chains 13 after which it is straightened by a scroll 14 and enters a stabilizing conveyor 15. The cane is then pre-topped by a cutter 21, grasped at its top by a longitudinal carrier 17 and severed from the earth by a cutter 26. The cane is then carried rearwardly by the carrier 17 and is subjected to the cleaning action of a battery of primary strippers 30, upon completion of which the cane stalk is grasped proximate its mediate portion by a loader conveyor 27, after which the cane is finally topped by a cutter 23. The cane is then passed through an inclined loading leg 27a of the conveyor 27 at which time the lower portion of the stalk is subjected to the stripping action of the set of secondary strippers 31. The clean cane stalk is then loaded into a basket (not shown) for discharge into a cane cart for transportation to the refinery.

10 designates a cane harvester adapted to travel through the field on the front and rear wheels 11 and 12 and having down the longitudinal center thereof a channel to permit the machine to pass over growing cane stalks. The usual pick-up endless chains 13 are shown in the forward portion of the harvester which chains move together in their inner adjacent runs to guide the cane stalks into the longitudinal channel. The cane stalks are then straightened by a spiral scroll 14.

Disposed in the central longitudinal channel slightly rearwardly of the inner runs of the pick-up chains 13 is a stabilizing conveyor 15 mounted upon the harvester to walk along with the cane stalks as the harvester moves forwardly; or in other words to advance the cane stalks through the longitudinal channel.

Arranged vertically above and horizontally overlapping the stabilizing conveyor 15 is a vertically elevatable cane cutting and stripper unit 16 which may consist, for example, of a longitudinal carrier 17 which comprises one or more runs of sticker chain endless conveyors 18 adjacent one longitudinal run of which is a pressure bar 19 maintained in place a predetermined distance from the sticker chain by suitable arch supports 20 to permit passage of the cane between the pressure bar and sticker chain longitudinally along the unit 16. The pressure bar 19 has a leading forward portion 19a flared outwardly and forwardly of the sticker chains 18. The throat defined between the flared bar 19a and sticker chain 18 is of a tapered form whereby the cane stalks are brought into contact with the sticker chain 18 under gradual pressure to prohibit immediate crushing of the top of the cane stalk.

Carried at the top forward end of the carrier 17 is a disc-like hydraulically operated pre-topping cutter 21 disposed to pre-top the cane stalk prior to pressing the stalk upper portion between the pressure bar 19 and sticker chain 18. This pre-topping cutter 21 is reversable in the direction of its cutting action in order that the topped material can be selectively deposited in a harvested row rather than into a row of standing cane. A support bracket 17a carries the stationary portion of the cutter and maintains it in the desired predetermined relationship with respect to the throat of the sticker chain conveyors.

Extending downwardly and rearwardly from the carrier 17 is a stripper support 22 for carrying a battery of pimary strippers 30 as will be more fully describer hereinafter.

Aft of the primary strippers 30 and disposed with its cutting edge horizontally parallel to the carrier 17 and just beneath same is a final topper 23. The vertical distance between the horizontal cutting surface of the pre-topper 21 and the final topper 23 is dependent upon the number of vertically disposed horizontal runs of sticker chains 18. As illustrated for two runs of sticker chains 18 the distance would be of the order of six inches. This six inch portion of the stalk is that portion tenaciously gripped by the sticker chains 18 which hold the cane stalks during their travel rearwardly of the harvester against the downward and rearward pull of the primary strippers 30. This results in a crushing or shredding of these top portions thereby necessitating their removal from the cane stalks in order that the exposed or shredded inner pith fibers of the stalks containing the sucrose do not begin decomposition due to their exposure to air and moisture prior to refining at the cane mill. I have found in practice that the best cleaning action is obtained by grasping the cane at its top and stripping same downwardly and at the same time stripping is taking place imparting a rearwardly directed vector to accelerate passage of the cane through the harvester.

The pressure bar 19 has an outwardly flared rear extension 19b extending beyond the rear of the harvester frame for discharging the severed top stubs of cane rearwardly of the harvester.

The above described topping and stripping unit is mounted for instantaneous raising or lowering. This mounting may consist for example of a hydraulic mechanism in which the cylinders 24 are secured to the harvester frame and the piston rods 25 are secured to an arbor 25a which supports the cutting and stripping unit 16. The cylinder 24 has a supply and return line from a hydraulic pressure source, a pump which may be either driven from an auxiliary engine unit on the harvester or from the main propulsion plant of the harvester between the engine drive shaft and transmission (not shown) in a manner well known to the art of hydraulic lifts. The elevating mechanism for raising and lowering the unit 16 may be mechanical rather than hydraulic by replacing the cylinders 24 with winches and the piston rods 25 with suitable flexible cables in a manner well known in the hoisting art. A control valve or lever (not shown) for selectively raising or lowering the unit 16 will be placed in circuit with the elevating mechanism and disposed on the harvester frame in a position convenient to the hand of the harvester operator.

Cooperating with the topping and stripping unit and positioned beneath the forward portion thereof is a disc type rotary stalk cutter 26 carried by the harvester frame 10. This cutter 26 is rearwardly of the pre-topper cutter 21 so that the cane is firstly topped while still connected to the earth.

Also cooperating with the topping and stripping unit at its rear portion and beneath same is a loader conveyor 27 mounted on the harvester frame 10 and having a portion thereof extending beneath the unit 16 and being horizontally in advance of the final topper 23 to take a firm purchase upon the cane stalks prior to the severance of the top portion of the stalk by the final topper. This loader conveyor has its leading end in alignment with the sticker chain conveyors 18 to receive the cane stalks therefrom at a point below the sticker chain conveyors 18. The rear portion of the loader conveyor 27 turns to one side of the harvester and passes through an angle greater than ninety degrees and is elevated vertically to communicate with a loader discharge basket (not shown) but illustrated and described in my copending application Serial 159,807, filed May 3, 1950, now U. S. Patent No. 2,667,732. This loader conveyor is also provided with the conventional pressure bars 28 and sticker chains 29 for grasping the cane stalk. The pressure bar 28 is flared outwardly at its leading end to facilitate reception of the cane stalk into the conveyor.

Carried by the harvester frame at the rear thereof and positioned beneath the vertically inclined leg 27a of the loader conveyor is a battery of secondary strippers 31, shorter in chain run and having fewer stripper fingers than the primary strippers 30. The secondary strippers are positioned to engage the lower portion of the cane stalk which has been about two-thirds stripped by the primary strippers and to complete the stripping action leaving a completely clean cane stalk to be loaded into the loader basket. The secondary strippers 31 exert their stripping action downwardly against the vertical elevation of the stalk by the inclined leg of the loader conveyor, as shown by the arrows in Figure 10. They may also be adjusted vertically to compensate for agricultural variables in cane.

The novel form of stripper finger employed to strip the cane stalk of its foliage will first be described as an entity unto itself and thence a description of the battery of primary and secondary strippers follows.

A satisfactory form of stripper finger in practice has been found to be generally of triangular form and may be, for example, as that shown in Figures 7 through 9, inclusive, in which the finger 32 is in the form of an obtuse triangle having a connected base L and an altitude M, Figure 7. In the form illustrated, the distance L is of the order of three inches and the altitude M is of the order of three and three-quarters inches. The above dimensions apply to the finger installed upon a straight run of chain without a stalk of cane therebetween. The finger 32 has a short arm 33, a hypotenuse 34 and an open end 35 which would be the long arm of a triangle. The portion lying between the parts 33 and 34 is open to permit the finger to have a high degree of resiliency and which permits of a physical temporary deformation of the finger upon its rounding a sprocket as illustrated in Figure 9. Under the deformation action of the finger illustration in Figure 9, the connected base L increases to a dimension of the order of three and three-quarters inches and the altitude M diminishes to a dimension of the order of three and one-quarter inches. It is to be noted that these deformation dimensions are based upon the finger rounding a four inch sprocket.

The principle herein involved is that maximum distortion is obtained with smaller diameter sprockets and minimum distortion with larger sprockets or stated another way, distortion increases proportional to a decrease in the radius of the surface over which a chain having a finger attached is passed. The larger the diameter of the sprocket the closer its approach to a straight line function and hence the lesser degree of distortion.

The fingers 32 may be made from any suitable substance having resiliency sufficient to meet the above temporary deformation characteristics and which will not injure the outer surface fibers of the cane stalk with which they come into contact. One form of the fingers may be of a moulded rubber.

Heretofore straight stripper fingers have been employed for this defoliating operation and because of their undeformed substantially straight surfaces have afforded a support for cane foliage or trash. The foliage or trash would adhere to the straight type finger even though subjected to a whipping action as the finger passed over a sprocket. This would often times result in the trash clinging to the finger and being reintroduced into the machine, often matting or jamming the battery of strippers to a point where they became completely ineffective in their stripping action.

In distinction to the straight flexible projection type finger, the improved finger, illustrated in Figures 7 through 9, eliminates the drawbacks set forth above. The improved finger, through elongation of the distance L and decrease in distance M upon passage of the finger about the sprocket, reduces the effective surface to which the mass of foilage may adhere. Changes of these distances, when combined with the whipping action of the finger as it passes about the sprocket, shown in Figure 9, causes a shifting in the weight moment of the mass of foliage and causes same due to the centrifugal force involved to be ejected from the finger.

The upper triangle-like finger, illustrated in Figure 7, has a small wedge-like open area between the short arm or support member 33 and the hypotenuse arm or wiper member 34. As shown in Figure 9, this open area is increased in surface area and the V-type wedge is deformed. This increase in open area cooperates with the deformation of the short arm and hypotenuse of the finger when combined with the centrifugal whip about the sprocket to dislodge foliage adhering to the finger.

The primary strippers 30 may consist, for example, of several runs of endless chains 36 carried about sprockets 37, 38 and 39 as best seen in Figures 2 and 3 wherein sprockets 38 and 39 are positioned one above the other to provide two outwardly and downwardly divergent whips for each finger 32 secured to the chains 36 as they pass thereover. Each chain of a set of endless chains is arranged in a staggered relationship with the stripper fingers of each transversely spaced run of endless chains in overlapping staggered relationship.

The sprockets are secured to shafts 40, 41 and 42, the shaft 40 being a driver sprocket and the others being idlers. The drive sprocket 40 is connected to a gear box 44 by a shaft 45. The gear box 48 receives its power from a chain drive 46 connected to the load side of the harvester transmission (not shown). A shaft 47 connects the gear box 44 to the box 48 and this shaft has secured thereon for rotation therewith a sprocket 49 for driving the sticker chain conveyors 18 as well as the final topper 23 through an endless chain drive 50.

The drive sprocket 37 imparts a driving motion to the stripper chains as shown in the left hand side of Figure 3 through a sprocket-chain transmission including a gear reversing box 51 whereby the inner spaced apart runs are both directed downwardly whereby the stripping action of all sets of fingers is in a downward direction.

The fingers 32 are rigidly secured to the chains by connectors or stand-off connectors 33', 34' and are held in place upon the attaching lugs 52 by retaining pins 53, the heads of which may be peened. It is to be noted that for the example given above the links carrying the attaching lugs 52 are separated by one link, providing the three inch dimension between the center lines of the pins 53. The fingers 32 on transversely spaced endless chains are staggered with respect to one another as best seen in Figures 3 and 7. The primary strippers 30 are mounted upon the support 22 which extends downwardly and rearwardly from the under side of the longitudinal carrier 17 at an angle of the order of sixty degrees. The support 22 may be secured to the carrier 17 in any suitable way as by welding or bolting in place.

The secondary strippers 31 are constructed in a manner similar to the primary strippers. The same principle of construction and operation applies, that is the triangular sprocket arrangement consisting of sprockets 54, 55 and 56 carried by rearwardly declined supports 58 and having an endless chain 57 thereabout upon which is mounted a plurality of stripper fingers 32 as described hereinbefore.

These chains and fingers are driven in a manner that both the inner runs are directed downwardly in the direction of the arrows.

The operation of the improved topper and stripper as installed upon a cane harvester is as follows:

The harvester is driven into a field of standing cane under its own power and brought into position with a row of standing cane to be harvested in registry with the central longitudinal channel permitting the harvester to pass over the row of cane. As the harvester is driven over the row, the pickup chains 13 guide the cane stalks into the longitudinal channel where they are straightened by the spiral scroll 14.

The cane stalks enter between the teeth of the stabilizer conveyor 15 where they are not rigidly grasped but in fact are permitted a wobble-like fit. The speed of this conveyor is approximately ten percent greater than the over-the-ground speed of the harvester. The cane then contacts the inner leading edge 19ᵃ of the flared pressure bar where it is gradually urged into the constricted throat of the topping and stripping unit 16. Prior to the cane being grasped by the sticker chain conveyors 18 under pressure the pre-topping cutter 21, which has been adjusted to the proper vertical height by the operator raising or lowering the unit 16 hydraulically through cylinders 24, rotating in a direction away from adjacent rows of standing cane cuts the top sprout from the cane and hurls it into a vacant cane row. The harvester in its forward motion then places the sticker chains 18 into contact with the cane under pressure and the stalk severing rotary cutter 26 frees the cane stalks at their bottom from their earth connection. The cane stalks are now moved rearwardly only by virtue of the motion of the sticker chain conveyors 18 of the unit 16 and not by the motion of the harvester over a fixed standing row of cane.

The cane stalks grasped at their top by the sticker chains 18 are then advanced rearwardly where the stalks enter the battery of primary strippers 30. Due to the angle of the stripper support 22 the cane stalks will enter between a pair of stripping fingers 32, one on each of two horizontally offset endless chains. The hypotenuse 34 of each stripper finger 32 wipes downwardly over the cane stalk and strips the foliage from the stalk and hurls it downwardly and outwardly from the strippers upon the earth. As illustrated, two sets of stripping fingers 32 will be in stripping engagement with each individual cane stalk as it is passed through the primary strippers 30. If two sets of stripper fingers are insufficient for the complete stripping action of a particular specie of cane then the battery of primary strippers may be enlarged by the additional number of sets necessary to attain the desired results.

After the cane stalks have been two-thirds or more stripped by the action of the primary strippers 30, the cane stalks then encounter the flared leading end of the pressure bar 28 of the loader conveyor 27. The stalk is then forced under pressure into contact with the sticker chain 29 by which it is continued to be moved rearwardly of the harvester. After being gripped by the loader conveyor the cane stalk then encounters the final topper 23 which severs the cane stalk from the gripped stub, that is that portion which has been gripped by the sticker chain conveyors 18 of the topping and stripping unit 16. The cane stalk is now advanced by the loader conveyor 27 and after being turned laterally through an angle greater than ninety degrees is elevated by the loading leg 27ᵃ. This action imparts not only a horizontal motion transversely of the conveyor to the stalk but also a vertical vector is introduced. The cane stalk then encounters at its lower portion the secondary battery of strippers 31 which complete the stripping of the lower portion of the cane stalk, that is any lower portion not completely stripped by the primary strippers. Under some circumstances, dependent upon the vertical height of the topping and stripper unit 16, the primary strippers 30 will effectuate a complete stripping of the cane. However, when the unit 16 is elevated to the position shown in dotted lines in Figure 5, it will be appreciated that due to the fixed length of the primary stripper support 22, the cane stalks will not be completely stripped by the primary strippers 30 and therefore the action of the secondary strippers 31 becomes an essential element to attaining an absolutely clean stripped stalk of cane ready to be sent to the refinery.

The stubs or portions of the cane stalks gripped by the sticker chain conveyors 18, which have been severed from the cane stalks by the final topper 23, are carried rearwardly by the sticker chain conveyor 18 and discharged from the rear of the harvester as best seen in Figures 1 and 5.

In the operation of the topper and stripper, it is important to note that there exists a fixed relationship between the pre-topper 21 and the final topper 23 and that this distance is of a fixed value regardless of the raising and lowering of the topping and stripping unit 16. In other words there exists a definite cooperative fixed relationship between the pre-topping, the stripping and the final topping of the cane stalk.

All power-driven conveyors are connected to receive their power supply after the transmission and gear ratio is selected in order to maintain a constant proportion rate of speed for each operation for a given speed of harvester over the ground. For example, if the over-the-ground speed of the harvester is increased, all conveyor speeds and stripping speeds are proportionally increased thereby assuring an even rate of passage of cane through the harvester without any resultant clogging or jamming of cane in the machine due to the inability of the conveyors to pass the cane and the strippers to strip it.

The harvester operator has a vantage point from his seat on top of the harvester from which he may observe the line of maturity of the row of cane he is harvesting. This has a definite appearance of a gold line and the harvester operator may take note in advance of elevations and depressions of this line in the standing cane to be topped and he may therefore make such vertical height adjustment of the unit 16 as practice deems appropriate.

The speed ratios between the various conveyors and stripper members bear a definite relationship to one another and by way of example an illustration of the speeds of each employed for a given over-the-ground speed of the harvester would be as follows.

If X equals forward speed of the harvester in feet per minute and the carrier conveyor 15 travels a small percentage faster toward the rear in order to straighten up the cane, then the cane speed in feet per minute is $X+V$ percent. The sticker chain conveyor 18 should travel in feet per minute speed $(X+V$ percent$)+$(secant of angle to horizontal of the conveyor 18). The primary strippers 30 should travel in feet per minute speed $(X+V$ percent$) \times$(secant of angle of the strippers to horizontal) as for example:

Let X equal three hundred feet per minute and if the increase is ten percent for the carrier conveyor 15 then $X +$ ten percent equals three hundred thirty feet per minute speed of carrier conveyor 15. If the primary strippers are disposed at an angle of sixty degrees to the horizontal then three hundred thirty times 2.000 equals six hundred sixty feet per minute.

The above speed ratios for the various parts may be achieved by employing sprockets of appropriate diameter and gears of appropriate ratio in a manner well known to those skilled in the art of manufacture of agricultural machinery.

Although I have disclosed herein the best form of the invention known to me at this time, I reserve the right to all such modifications and changes as may come within the scope of the following claims.

What I claim is:
1. A foliage stripping finger for an endless stripping chain of a cane harvester or the like comprising a substantially V-shaped member of resilient plastic material having stand-off connectors rigidly joined to the terminal portions thereof.
2. A foliage stripping finger for an endless stripping chain of a cane harvester or the like comprising a substantially V-shaped member of resilient plastic material having stand-off connectors rigidly joined to the terminal portions thereof, each of said connectors being rigidly attached to a link of said chain.
3. A foliage stripping finger for an endless stripping chain of a cane harvester or the like comprising a substantially V-shaped member of resilient plastic material having stand-off connectors rigidly joined to the terminal portions thereof, each of said connectors being rigidly attached to a link of said chain, and means associated with said chain and finger for imparting a rearwardly declined stripping motion to said chain with respect to the direction of advance of the harvester.
4. A foliage stripping finger for an endless stripping chain of a cane harvester or the like comprising a substantially V-shaped member of resilient plastic material having stand-off connectors rigidly joined to the terminal portions thereof, foliage stripping chains rigidly secured to said connectors and V-shaped member, and sprocket-like means over which said chain is roved for subjecting the rigidly joined terminal portions of the V-shaped member to a prying force to open the crotch of the V to discharge foliage therefrom upon completion of the stripping action.
5. A foliage stripping finger for an endless stripping chain of a cane harvester or the like comprising a substantially V-shaped member of resilient plastic material having stand-off connectors rigidly joined to the terminal portions thereof, one leg of said V-shape being of greater length than the other.
6. A foliage stripping finger for an endless stripping chain of a cane harvester or the like comprising a substantially V-shaped member of resilient plastic material having stripping chain connectors rigidly joined to the terminal portions thereof, means rigidly associated with said connectors for imparting a stripping motion to the finger and means associated with said first means and said finger for deforming said V-shaped member upon completion of the stripping motion to open the crotch of the V to discharge stripped foliage therefrom.
7. A foliage stripping finger for an endless stripping chain of a cane harvester or the like comprising a substantially V-shaped member of resilient plastic material having stripping chain connectors rigidly joined to the terminal portions thereof, an endless stripper chain roved over sprockets, and means associated with said connectors and spaced links of said chain whereby upon said member passing around a sprocket the legs of the V-shaped member are pried open to discharge trash therfrom.
8. For use with a sugar cane harvester or the like, a foliage stripper finger for sugar cane comprising a substantially V-shaped member of resilient plastic material, means operatively associated with said finger for imparting a stripping action to said finger, and means rigidly associated with the terminal portions of said V-shaped member and said first means for prying said V-shaped member open upon completion of the stripping action to discharge foliage accumulated thereon during the stripping action.
9. For use with endless stripper chains roved over sprockets at least one of said sprockets being located at the end of the stripping run of said chains, a stripping element comprising a substantially V-shaped member, one leg of which is longer than the other, said member being of a resilient plastic material, chain connecting means rigidly secured to the free ends of the legs of said V-shaped member and said chain to stand said member off from said chain and to be rigidly secured to said chain whereby upon said connecting means passing around a sprocket at the end of said stripping run the legs of said member are pried open to discharge trash therefrom.
10. For use with a sugar cane harvester having a stalk cutter and topper; a cane cleaning device comprising a plurality of rearwardly declined spaced adjacent endless stripper chains, stripping fingers of substantially V-shape stripper chains, stripping fingers of substantially V-shape rigidly secured to said stripping chains at their terminal ends in overlapping staggered relationship, said fingers being secured to the chains with the crotch of the V of the fingers of one stripper chain directed toward the crotch of the V of a spaced transversely adjacent stripper chain, and means associated with said stripper chains and said stalk cutter and topper for positioning said stripper chains and fingers between said stalk cutter and topper to strip foliage from the portion of cane stalks passing therebetween.
11. For use with a harvester or the like having transversely spaced adjacent interlaced endless foliage stripper chains having sprockets at the end of their stripper runs, foliage stripping fingers of resilient plastic material and being of substantially V-shape, chain attaching connectors rigid with the terminal portions of said V-shape fingers, and connecting means rigidly associated with said chain attaching connectors of the legs of said V-shaped fingers for securing the free ends of said legs rigidly to said chain whereby one leg of said fingers has a stripping motion imparted thereto for stripping foliage and upon completion thereof and upon rounding the sprockets said connectors diverge prying the legs of said V shape fingers to open the crotch to discharge foliage therefrom, said stripping fingers being arranged in transverse overlapping and longitudinal staggered relationship on each adjacent pair of stripping chains to engage the front and rear of a stalk to be defoliated in frictional wiping relationship therewith.
12. A device as claimed in claim 11 further comprising means associated with said endless chains and harvester for imparting a rearwardly and downwardly stripping motion to the finger with respect to the line of advance of the harvester over standing cane.
13. For use with a harvester or the like having transversely spaced adjacent interlaced endless foliage stripper chains having sprockets at the end of their stripper runs, foliage stripping fingers of resilient plastic material and being of substantially V-shape, chain attaching connectors rigid with and extending off from the terminal portions of said fingers, and connecting means rigidly associated with the free ends of the legs of said V-shaped fingers and said stripper chains for securing said free ends to said connectors whereby one leg of said fingers has a stripping motion imparted thereto for stripping foliage and upon completion thereof and upon rounding the sprockets said connectors diverge prying the legs of said V-shape fingers to open the crotch to discharge foliage therefrom.

References Cited in the file of this patent
UNITED STATES PATENTS

| | | |
|---|---|---|
| 1,168,467 | Bell | Jan. 18, 1916 |
| 1,365,213 | Woodland | Jan. 11, 1921 |
| 2,447,122 | Horst | Aug. 17, 1948 |
| 2,472,468 | Digby | June 7, 1949 |
| 2,516,277 | Vichie et al. | July 25, 1950 |
| 2,556,509 | Thomson | June 12, 1951 |
| 2,667,732 | Thomson | Feb. 2, 1954 |